Dec. 6, 1949 M. S. DUNKELBERGER 2,490,583
COMPOSITE FISHHOOK
Filed March 14, 1944

Inventor
Milton S. Dunkelberger
By Henry Godzvig
Attorney

Patented Dec. 6, 1949

2,490,583

UNITED STATES PATENT OFFICE 2,490,583

COMPOSITE FISHHOOK

Milton S. Dunkelberger, Dayton, Ohio, assignor to The American Display Company, Dayton, Ohio, a corporation of Ohio Application March 14, 1944, Serial No. 526,401

8 Claims. (Cl. 43—27)

1

This invention relates to a fish-hook assembly and more particularly to a composite fish-hook that may be disassembled for storage.

An object of this invention is to provide a composite fish-hook assembly that is produced from few parts, easily manufactured and assembled so as to produce a fish-hook assembly that is sturdy, dependable and efficient and that may be disassembled and put into a small kit snugly holding the parts, so as to be adapted for emergency use.

Another object of this invention is to provide a fish-hook assembly that may be used as a fish-hook, as a grapple hook, as an anchor and may be used for numerous other purposes.

Another object of this invention is to provide a demountable gaff hook adapted to be attached to a rod or pole.

Other objects and advantages reside in the construction of parts, the combination thereof and the mode of operation, as will become more apparent from the following description.

In the drawings, Figure 1 is a cross sectional view of a portion of a gaff or fish-hook, taken substantially on the line 1—1 of Figure 2.

Figure 2:
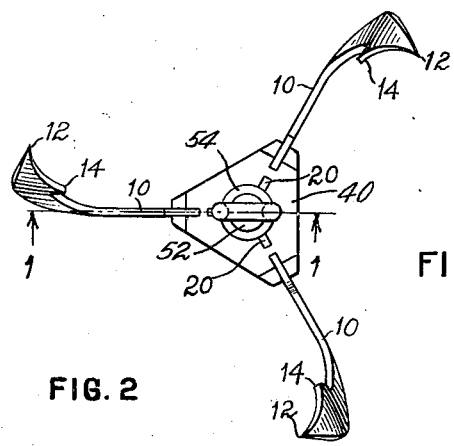
Figure 2 is a top plan view looking down upon the fish-hook or gaff shown in Figure 1.
Figure 5:
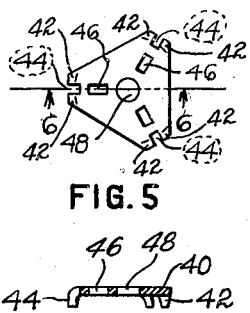
Figure 5 is a top plan view of a retaining plate or capping member.
Figure 6:
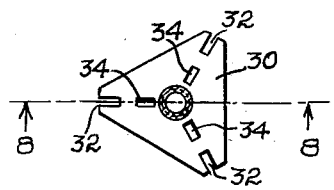
Figure 6 is a cross sectional view of a retaining plate or capping member, taken substantially on the line 6—6 of Figure 5.
Figure 7:
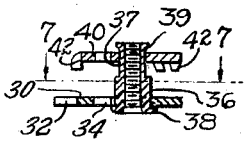
Figure 7 is a cross sectional view taken substantially on the line 7—7 of Figure 8, so as to show the supporting member.
Figures 1, 3, 10:
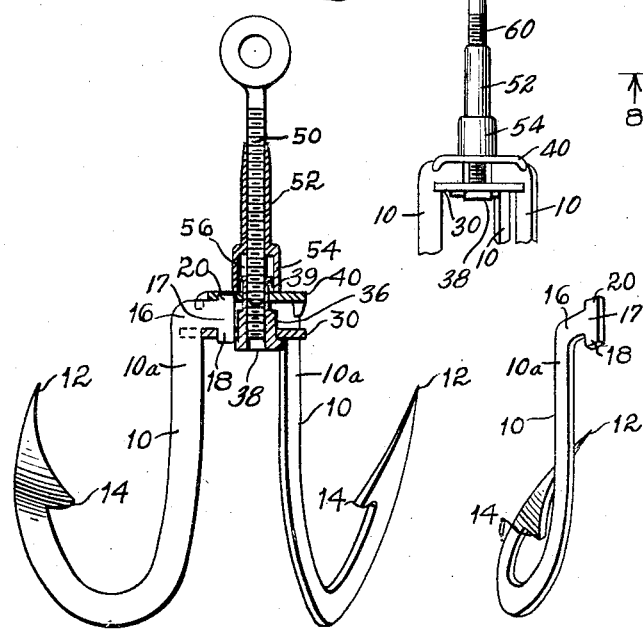
Figure 3 is a perspective view of one of the hooks.
Figures 4, 8:
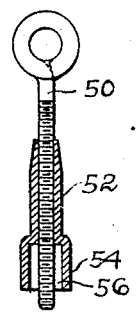
Figure 4 is a longitudinal cross sectional view of a tubular retainer member.
Figure 8 is a cross sectional view of the support, taken substantially on the line 8—8 of Figure 7.

Figure 10 discloses the continuation of the fish rod or gaff rod used as a threaded member.

The fish-hook assembly disclosed herein may be used in an emergency kit carried by aviators, by sailors, by fishermen and others.

Referring to the drawings, the fish-hook assembly includes three hooks 10 made from a sheet metal stamping. This stamping 10 is made with a chisel-shaped point 12 that may be made by the same process as the fish-hook points disclosed in my United States Letters Patent No. 2,334,613 issued November 16, 1943, for Fish-hook. Each fish-hook is provided with a barb 14. The hook portion 12 is preferably deflected from the plane of the original stamping, so that the fish-hook assembly has a spiral-like twist to the hooks. The upper end of the hook is provided with a neck portion 16 terminating in a head 17 including a pair of lugs or ears 18 and 20. The stems or shanks 10a of the hooks extend in substantially parallel relation to each other and in the same general direction. Three of these hooks 10 are used in forming the hook assembly.

The hooks 10 are mounted upon the support 30 including three arms, each of which terminates in a notch 32 receiving the neck 16 of the hook. Three slots 34, radially disposed with respect to the notches 32, provide seats for the lugs 18. The support 30 is provided with a threaded sleeve 36, having a spun retaining flange 38.

A retaining plate or capping member 40, provided with downwardly projecting flange portions 42, is used in retaining the hooks in proper relation with respect to the support 30. This retaining member 40 has a plurality of marginal notches 44, one for each hook, and a plurality of slots 46, the slots being radially disposed with respect to the notches 44, there being one slot for each notch. The center of the retaining member 40 is provided with an aperture 48. The reduced end 37 of the sleeve 36 projects through the aperture 48 and is provided with a retaining flange 39. This retaining flange 39 holds member 40 on the sleeve. Member 40 is mounted for sliding movement on the reduced portion 37 of the sleeve 36. Members 30 and 36 have a relative movement with respect to member 40, so as to provide an adjustable support for the hooks.

Hook holding means includes a screw-eye 50 threadedly engaging a tubular sleeve or nut 52 having an enlarged flange or skirt portion 54. The flange or skirt portion 54 is arranged in spaced relation from the threaded portion of the screw-eye 50, so as to provide an annular cavity 56.

The hooks are inserted between members 30 and 40 with the projections 18 and 20 projecting into the slots 34 and 46 respectively. The neck portion of the hook is positioned in the notches 32 and 44. After the hooks have been placed in position, which is made possible by the sliding arrangement of member 40 on the sleeve 36, the retaining means, including the screw-eye 50, is screwed into position, as shown in Figure 1, with the screw-eye threadedly engaging the sleeve 36 and the flange or skirt 54 pressing against member 40, so as to clamp the hooks between members 30 and 40 to hold the hooks in a rigid, fixed relation with respect to each other and with respect to the supporting means. The reduced end of the tubular sleeve 36 projects into the cavity 56, so that ample clearance is provided to clamp the hooks in position. The line is tied or otherwise secured to the eye of the screw-eye 50. Instead of a screw-eye being used, any suitable threaded member may be used to hold the parts together. The threaded member 60 may be a continuation of a fish rod or a gaff rod as clearly shown in Figure 10.

Figure 9:
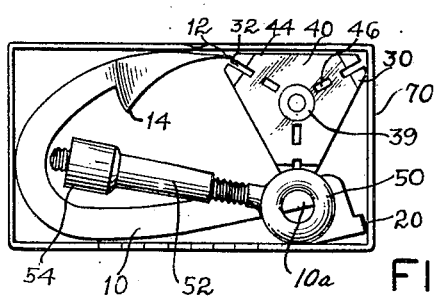
Figure 9 shows the parts positioned in a kit or container that may be used as an emergency kit.

When the hook assembly is not in use, it may be disassembled and placed in a box 70, as shown in Figure 9, requiring a small space, so that the kit may be carried in the vest pocket, in a pack or in any other suitable place. Whenever it is desired to use the hook assembly, the parts may be assembled as described above.

The hook assembly, in addition to being used as a gaff, may be used in catching turtles and gar fish; it may be used as an emergency hook, so as to be available when grappling for bodies in the water, or it may be used as an anchor hook and for numerous other purposes.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A fish-hook assembly including a plurality of fish-hooks, each provided with a neck portion terminating in an upper lug and a lower lug, a supporting member having a plurality of arms one for each hook, said arms being provided with slots in which the lower lugs are seated, a retaining member arranged in parallel relation with respect to the supporting member, said retaining member having slots for receiving the upper lugs of the hooks and means for securing the retaining member and the supporting member in fixed spaced relation to thereby interlock the hooks.

2. A fish-hook assembly including a plurality of fish-hooks each provided with an enlarged head opposite the bill of the hook, a supporting member having seats into which the heads are adapted to be positioned, a capping member having seats engaging the heads of the fish-hooks, a tubular member for interconnecting the supporting member and the capping member, said tubular member permitting adjustment of the capping member with respect to the supporting member, said tubular member being provided with internal threads, a screw threaded rod threadedly engaging the tubular member, and a screw threaded nut threadedly engaging said rod, said screw threaded nut terminating in a flared skirt portion engaging the capping member so as to clamp the heads of the fish-hooks between the capping member and the supporting member.

3. A fish-hook assembly including a plurality of fish-hooks each provided with an enlarged head opposite the bill of the hook, a supporting member having seats into which the heads are adapted to be positioned, a capping member having seats engaging the heads of the fish-hooks, a tubular sleeve fixedly attached to one of said members, the other of said members having an aperture through which the tubular sleeve projects, said other member being movably mounted upon the tubular sleeve, a screw threaded rod projecting into the tubular sleeve, and a nut threadedly engaging said rod, said nut including means projecting on the outside of the tubular sleeve to engage said other member to clamp the heads of the fish-hooks between said members.

4. A fish-hook assembly including a plurality of fish-hooks each provided with an enlarged head opposite the bill of the hook, a supporting member having seats into which the heads are adapted to be positioned, a capping member having seats engaging the heads of the fish-hooks, a tubular sleeve fixedly attached to one of said members, the other of said members having an aperture through which the tubular sleeve projects, said tubular sleeve having internal threads, a screw threaded rod threadedly engaging the tubular sleeve, and a nut threadedly engaging said rod, said nut including a flanged portion providing a cavity for the end of the tubular sleeve so that as the nut is tightened against said other member the heads of the fish-hooks are clamped between said members.

5. A fish-hook assembly including a plurality of fish-hooks each provided with an enlarged head opposite the bill of the hook, a supporting member having seats into which the heads are adapted to be positioned, a capping member having seats engaging the heads of the fish-hooks, said members being provided with coaxially disposed apertures, a tubular sleeve projecting into one of the apertures and provided with an upset portion for holding the tubular sleeve in fixed relation with said one member, said tubular sleeve projecting through the aperture in the other member, which other member has a sliding movement upon the tubular sleeve, the end of the tubular sleeve opposite the fixed end being flared so as to form a flange holding said other member upon the tubular sleeve, and means for clamping said other member slidably mounted upon the tubular sleeve against the heads of the fish-hooks so as to hold the fish-hooks in fixed spaced relation relative to each other.

6. A fish-hook assembly including a plurality of fish-hooks each provided with an enlarged head opposite the bill of the hook, a supporting member having seats into which the heads are adapted to be positioned, a capping member having seats engaging the heads of the fish-hooks, said members being provided with coaxially disposed apertures, a tubular sleeve projecting into one of the apertures and provided with an upset portion for holding the tubular sleeve in fixed relation with said one member, said tubular sleeve projecting through the aperture in the other member, which other member has a sliding movement upon the tubular sleeve, the end of the tubular sleeve opposite the fixed end being flared so as to form a flange holding said other member upon the tubular sleeve, said tubular sleeve being provided with internal threads, a threaded member threadedly engaging said tubular sleeve, and means supported upon said threaded member for engaging the slidable member to clamp the heads of the fish-hooks between the members.

7. A fish-hook assembly including a plurality of fish-hooks each provided with an enlarged head opposite the bill of the hook, a supporting member having seats into which the heads are adapted to be positioned, a capping member having seats engaging the heads of the fish-hooks, said members being provided with coaxially disposed apertures, a tubular sleeve projecting into one of the apertures and provided with an upset portion for holding the tubular sleeve in fixed relation with said one member, said tubular sleeve projecting through the aperture in the other member, which other member has a sliding movement upon the tubular sleeve, the end of the tubular sleeve opposite the fixed end being flared so as to form a flange holding said other member upon the tubular sleeve, said tubular sleeve being provided with threads, and means threadedly engaging the tubular sleeve and contacting the slidably mounted member so as to clamp the fish-hooks between said members when the means is tightened to thereby hold the fish-hooks in fixed spaced relation relative to each other.

8. A fish-hook assembly including a plurality of fish-hooks, each of said fish-hooks being provided with a shank portion, all the shank portions extending in the same general direction and substantially parallel to each other, each of said fish-hooks being provided with a pair of lugs, a supporting means having a plurality of slots one for a lug of each fish-hook, a second supporting means having a plurality of slots one for each of the other lugs of the fish-hooks, and means for clamping the fish-hooks between the first supporting means and the second supporting means so as to hold the fish-hooks in fixed spaced relation with respect to each other.

MILTON S. DUNKELBERGER.

REFERENCES CITED

The following references are of record in the file of this patent:

UNITED STATES PATENTS

| Number | Name | Date |
|---|---|---|
| 88,346 | Trafton et al. | Mar. 30, 1869 |
| 117,719 | Arnold | Aug. 8, 1871 |
| 289,508 | Dawson | Dec. 4, 1883 |
| 401,823 | Diebel | Apr. 23, 1889 |
| 605,758 | Snyder | June 14, 1898 |
| 1,234,291 | Conrad | July 24, 1917 |
| 1,264,658 | King | Apr. 30, 1918 |
| 1,352,979 | Lawrence | Sept. 14, 1920 |
| 2,145,992 | Parker | Feb. 7, 1939 |
| 2,334,613 | Dunkelberger et al. | Nov. 16, 1943 |

FOREIGN PATENTS

| Number | Country | Date |
|---|---|---|
| 87,247 | Germany | of 1896 |
| 544,852 | Germany | Feb. 24, 1932 |
| 588,300 | France | Jan. 29, 1925 |